(12) United States Patent
Laibson

(10) Patent No.: US 11,647,079 B2
(45) Date of Patent: *May 9, 2023

(54) EMULATION OF CLOUD COMPUTING SERVICE REGIONS

(71) Applicant: Digital Age Experts, LLC, Herndon, VA (US)

(72) Inventor: Benjamin William Laibson, Reston, VA (US)

(73) Assignee: DIGITAL AGE EXPERTS, LLC, Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/147,811

(22) Filed: Jan. 13, 2021

(65) Prior Publication Data

US 2021/0136156 A1    May 6, 2021

Related U.S. Application Data

(63) Continuation of application No. 16/401,379, filed on May 2, 2019, now Pat. No. 10,958,734.

(Continued)

(51) Int. Cl.
*H04L 67/125* (2022.01)
*H04L 9/30* (2006.01)
(Continued)

(52) U.S. Cl.
CPC .............. *H04L 67/125* (2013.01); *H04L 9/30* (2013.01); *H04L 43/065* (2013.01); *H04L 43/0817* (2013.01); *H04L 43/12* (2013.01)

(58) Field of Classification Search
CPC ...... G06F 40/30; G06F 3/0659; G06F 3/0679; G06F 40/295; G06F 12/0607;
(Continued)

(56) References Cited

U.S. PATENT DOCUMENTS 5,870,745 A * 2/1999 McCune .............. G06Q 10/087
705/28
8,255,491 B1 * 8/2012 Arzur .................. G06F 16/9535
709/219

(Continued)

OTHER PUBLICATIONS

International Search Report and Written Opiniion for Application No. PCT/US19/30448, dated Jul. 12, 2019, 13 pages.

(Continued)

*Primary Examiner* — Brian J. Gillis
*Assistant Examiner* — Thao D Duong
(74) *Attorney, Agent, or Firm* — Butzel Long

(57) ABSTRACT

Systems and techniques are provided for the emulation of cloud computing service regions. An emulation system receives an API request including an indication of an endpoint associated with a target region of a cloud computing service from a system in a virtual private cloud. Attributes are extracted from the API request. A manipulated API request is generated from the extracted attributes of the API request. The manipulated API request includes an indication of an endpoint located in a standard region of the cloud computing service. The manipulated API request is transmitted to the endpoint located in the standard region of the cloud computing service.

20 Claims, 9 Drawing Sheets

Related U.S. Application Data

(60) Provisional application No. 62/667,006, filed on May 4, 2018.

(51) Int. Cl.
 *H04L 43/065* (2022.01)
 *H04L 43/12* (2022.01)
 *H04L 43/0817* (2022.01)

(58) Field of Classification Search
 CPC ............ G06F 12/0811; G06F 12/0815; G06F 12/0828; G06F 12/0831; G06F 12/0833; G06F 12/084
 See application file for complete search history.

(56) References Cited

U.S. PATENT DOCUMENTS

| | | | |
|---|---|---|---|
| 9,083,534 B2 * | 7/2015 | Kirk | ................. H04L 9/3247 |
| 2005/0010661 A1 | 1/2005 | Southam | |
| 2005/0114113 A1 | 5/2005 | Quayle | |
| 2011/0289192 A1 * | 11/2011 | Denise | .................. G06F 8/656 |
| | | | 709/219 |
| 2012/0185913 A1 | 7/2012 | Martinez | |
| 2013/0332624 A1 | 12/2013 | Chewter | |
| 2014/0026122 A1 | 1/2014 | Markande | |
| 2014/0052617 A1 * | 2/2014 | Chawla | ................ G06Q 20/102 |
| | | | 705/39 |
| 2014/0226799 A1 * | 8/2014 | Aggarwal | ............. H04M 15/58 |
| | | | 379/32.01 |
| 2014/0280305 A1 * | 9/2014 | James | ..................... H04L 41/00 |
| | | | 707/769 |
| 2015/0007274 A1 | 1/2015 | Chang | |
| 2015/0100684 A1 | 4/2015 | Maes | |
| 2016/0241438 A1 * | 8/2016 | Sundaram | ........... H04L 41/0806 |
| 2017/0223117 A1 | 8/2017 | Messerli | |
| 2018/0041468 A1 | 2/2018 | Miller | |
| 2018/0255068 A1 * | 9/2018 | Figueroa | ................ H04L 67/563 |
| 2019/0104049 A1 * | 4/2019 | Cidon | ................. H04L 12/4633 |
| 2019/0123999 A1 * | 4/2019 | Chunduri | .............. H04L 67/147 |
| 2019/0207943 A1 * | 7/2019 | Edmaier | .............. H04W 12/08 |
| 2020/0329007 A1 * | 10/2020 | Lee | ..................... H04L 61/5053 |

OTHER PUBLICATIONS

Extended European Search Report for App. No. EP19796949.6, dated Jan. 19, 2021, 7 pages.

* cited by examiner

EMULATION OF CLOUD COMPUTING SERVICE REGIONS

BACKGROUND

Users of cloud computing services may desire for the cloud computing environment that they use to be in custom or air-gapped regions. An air-gapped region of a cloud computing service, which may be a cloud computing environment including servers and other systems and services, may provide cloud computing services that may not be accessed by anyone outside of the user for whom the air-gapped region was created. It may be difficult for a user to test whether their system will work correctly with a custom or air-gapped region of a cloud computing service before the custom or air-gapped region is set up and available for use. This may increase the time needed for, and cost of, the deployment of systems meant to work with a custom or air-gapped region of a cloud computing service. Users may also desire to determine whether their systems will work correctly on different regions of a cloud computing service that are not custom or air-gapped regions before switching their systems over to those regions.

BRIEF SUMMARY

In an implementation, an emulation system may receive an API request including an indication of an endpoint associated with a target region of a cloud computing service from a system in a virtual private cloud. Attributes may be extracted from the API request. A manipulated API request may be generated from the extracted attributes of the API request. The manipulated API request may include an indication of an endpoint located in a standard region of the cloud computing service. The manipulated API request may be transmitted to the endpoint located in the standard region of the cloud computing service.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
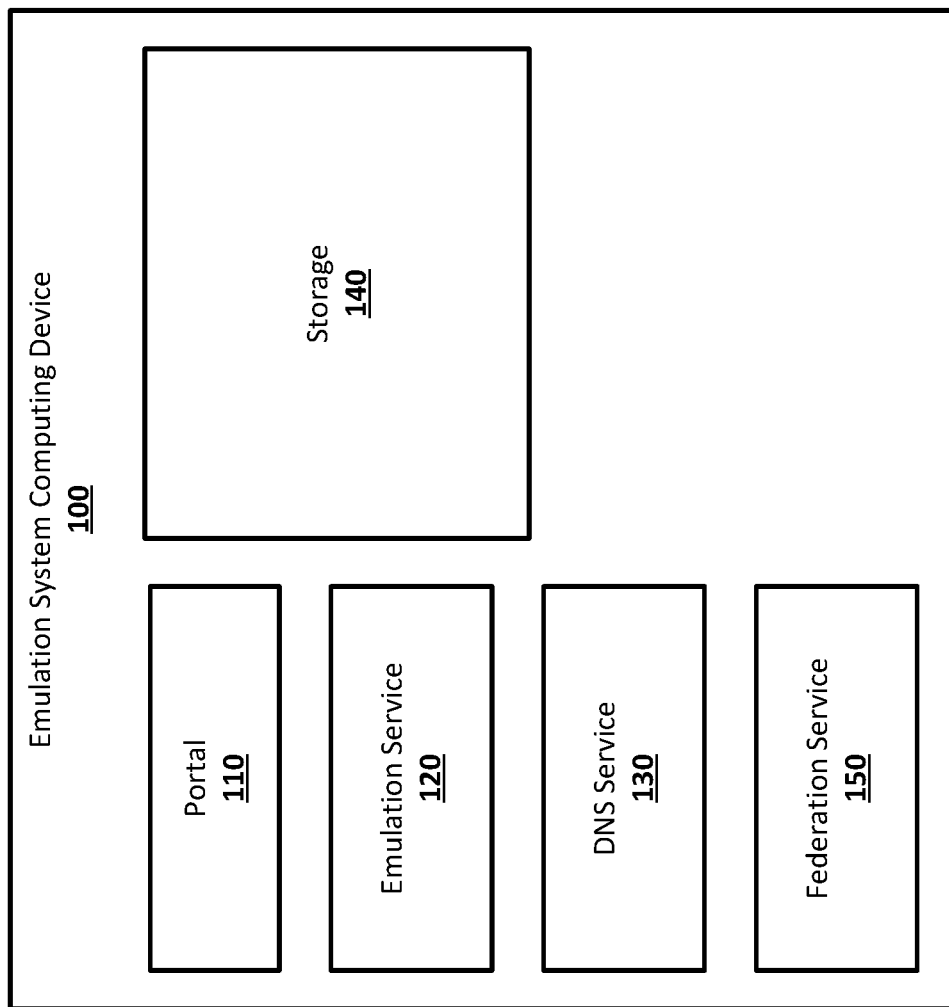
FIG. 1 shows an example system suitable for emulation of cloud computing service regions according to an implementation of the disclosed subject matter.

According to embodiments disclosed herein, the emulation of cloud computing service regions may allow for a target region, such as a custom or air-gapped region, of a cloud computing service to be emulated, allowing systems meant to work with the target region to be run without needing access to the target region, and without requiring the systems be reconfigured. This may allow systems and applications developed to work with a target region, such as a custom or air-gapped region, of a cloud computing service to be tested to ensure proper functionality with the target region before the target region is set up or otherwise made accessible or before the system is switched to a target region that is set up and accessible. After being tested using the emulated target regions, systems may be used with the actual target region without requiring modification. The emulation may reduce the time it takes to deploy systems to regions of a cloud computing service, including custom or air-gapped regions, as the systems may be developed and tested without having to wait for the region to be set up. The emulation may also allow for more efficient use of the cloud computing environment in the regions of a cloud computing service, as applications may be refined before being deployed.

An emulation system for the emulation of target service regions may be implemented using any suitable computing devices. For example, the emulation system may be implemented on server systems which may be remotely accessed by users who wish to test systems meant for regions such as custom or air-gapped or other standard, commercial, or governmental cloud computing service regions. The emulation system may, for example, run on a virtual private cloud hosted on a cloud computing service. The emulation system may work and manage, for example, several virtual private clouds on the cloud computing service. Virtual private clouds may be isolated environments on a cloud computing service that may be used to test systems on emulated custom or air-gapped regions of a cloud computing service. The virtual private clouds may be hosted on the same cloud computing service that the emulation system will emulate regions of. The emulation system may include a portal, which may be a public facing user interface that allows users to access the emulation system and the virtual private clouds. The emulation system may include an emulation service, which may emulate target regions, including custom or air-gapped regions, of a cloud computing service for users of the emulation system. The emulation service may be implemented as a set of application programming interfaces (APIs) which may emulate the APIs of cloud computing services. The emulation service may be able to receive API requests, or API calls, meant for a target region, such as a custom or air-gapped region, of a cloud computing service, perform suitable testing of the received API requests, and return responses to received API requests that include valid results to the originator of the API requests. The emulation system may include a Domain Name System (DNS) service which may be used to resolve address requests for cloud computing servers in target regions that may not yet exist or may otherwise be unavailable. The DNS service of the emulation system may be separate from internet DNS servers, and may only resolve addresses related to target regions for cloud computing services that are being emulated. The emulation system may include a federation service, which may provide access to a cloud computing service through the use of cryptographic certificates. The federation service may, for example, allow the emulation system to access a cloud computing service using a PKI certificate, which may belong to a user of the emulation system, or may belong to the emulation system. The emulation system may include data storage, which may store any suitable data for the emulation system, including, for example, user data and account data. The emulation system may include a search engine that may store and index API requests received by the emulation service so that users may search through their previous API requests. The emulation system may include a custom certificate authority which may create server and client certificates used by the emulation system. The custom certificate authority may create certificates that may be used to allow HTTPS communication between the emulation system and cloud computing services, and certificates that may be used with the federation service to allow federated access to cloud computing services.

A user may access the emulation system through the portal. The user may use a client virtual private cloud, hosted on a cloud computing service, to run a system that may be designed to work with a custom or air-gapped region of that cloud computing service. The system, running on the virtual private cloud, may generate API requests that are meant to be transmitted to computing devices, such as servers, that are part of the cloud computing environment in a target region of the cloud computing service. These computing devices may be endpoints for the cloud computing service. The target region may be any region of the cloud computing service that the user wishes to emulate, and may be, for example, a custom or air-gapped region, or may be a standard, commercial or governmental region of the cloud computing service. An API request generated by a system running in a client virtual private cloud may be received by the emulation service of the emulation system. The DNS service of the emulation system may resolve the address of an endpoint specified in the API request to an IP address belonging to the emulation system, so that API requests from the client virtual private cloud are routed to the emulation system. The emulation service may inspect the API requests, for example, running any suitable number of tests and checks on the API requests. The tests may be customizable, for example, by the user.

Tests run on API requests may include, for example, an Action_Not_Available test, an Attempt_To_Reach_Internet test, and Incorrect_Availability_Zone test, an Incorrect_Signature_Region test, an Invalid_ARN_Format test, an Invalid_Equipment test, and Invalid_Parameter_Value test, a Parameter_Not_Supported test, a Service_Not_Available test, an Invalid_Principal, and an Invalid_Resource test.

For the Action_Not_Available test, the emulation service may examine an API request to determine whether the action requested by the API request is available in the target region. The emulation service may determine the action requested in the API request either by examining an "Action" parameter of the API request or the "x-amz-target" header of the API request. The emulation service may have access to a list of actions that will be available in the target region and may determine if the action in the API request is on that list of available actions. The API request and action may be flagged if the action is not on the list of available actions.

For the Attempt_To_Reach_Internet test, the emulation service may check the hostname in an API request to determine if the hostname is an internet call or an API call to the target region. If the hostname is an internet call, the emulation service may flag the API request.

For the Incorrect_Availability_Zone test, the emulation service may examine the API request to determine if any of the passed parameters include an invalid availability zone. For example, if the target region has an availability zone format of "us-gov-west-1" and the passed availability zone in the API request is "us-west-1", the emulation service may flag the API request for having an incorrect availability zone. Availability zones may be found in various passed parameters of an API request.

For the Incorrect_Signature_Region test, the emulation service may determine if the API request was signed with cloud computing service region that is the correct region for the custom or air-gapped region. This region may be identified in the authorization header of any API request. For example, an API request may include an authorization header:
Authorization: Credential=ASIASGSX3GXDD7O6HYOT/20190227/us-east-1/ec2/aws4_request Additionally, the Incorrect_Signature_Region test may determine if any of the parameters in the API request include any invalid regions as part of the parameters.

For the Invalid_ARN_Format test, the emulation service may determine if any of the parameters in the API request include a resource name (ARN) that is incorrectly formatted. This emulation service may specifically determine if the partition and region portions of an ARN are valid for the target region.

For the Invalid_Endpoint test, the emulation service may determine if the API request is attempting to reach an endpoint that is in a standard, commercial, or governmental region, and not in the target region.

For the Invalid_Parameter_Value test, the emulation service may determine if any of the parameters in the API request include a value that is invalid in the target region. For example, if an API request includes a parameter for an EC2 Instance Type and that Instance Type is not valid in the target region, the emulation service may flag the API request.

For the Parameter_Not_Supported test, the emulation service may determine if any of the parameters themselves of the API request are invalid in the target region. These parameters may represent a feature that is not supported in the target region. The emulation service may examine the parameter name to determine if the parameter is supported and may flag parameters that are not supported.

For the Service_Not_Available test, the emulation service may determine if an API request is for a service that is available. Services that may be checked may include, for example, EC2, S3, EBS, DynamoDB, and similar services that may be offered by cloud computing services. For example, the emulation service may examine the hostname in the API request, or any other suitable attribute of the API request, to determine if the service subdomain is available.

For the Invalid_Principal, the emulation service may determine if any of the parameters in the API request include a Service Principal that is invalid in the target region. For example, if an API request includes a service principal of ec2.domain.com when the principal needs to be ec2.domain.com.cn for the target region, which may be, for example, the China region, the emulation service may flag the API request.

For the Invalid_Resource test, the emulation service may examine difference sources, for example, logs such as CloudTrail logs and AWS Describe APIs, to determine if any of the resources listed in the API request are invalid in the target region. For example, if a NAT Gateway is listed as a resource and NAT Gateways are not available in the target region, the emulation service may flag the API request. The CloudTrail logs and AWS Describe APIs may be generated, for example, by a system running on a standard region of a cloud computing service.

The API request may include a cloud computing service resource name. The cloud computing service resource name may be included in a header, parameters, query string, URL, or body of the API request. The emulation service may test the cloud computing service resource name to determine whether it is in the correct format to be used with the target region being emulated. For example, a standard cloud computing service resource name may be formatted as:
servicern:partition:service:region:account-id:resource
servicern:partition:service:region:account-id:resourcetype/ resource
servicern:partition:service:region:account-id:resourcetype: resource
"servicern" may be an indication that the statement is a cloud computing service resource name and may identify the cloud computing service where the resource is located, for example, by company name, "partition" may specify a partition of the cloud computing service where the resource is located, "service" may specify the service of the cloud computing service that include the resource, "region" may specify the region of the cloud computing service where resource is located, "account-id" may identify the account holder sending the API request that will use the resource, and "resource" and "resourcetype" may be used to identify the resource. For example, a completed cloud computing service resource name may look like:
am:aws:ec2:us-east-1:123456789012:instance/instance-id When a target region of a cloud computing service, such as a custom or air-gapped region, is used, the cloud computing service resource name included in an API request meant for the target region may need to be customized. For example, a completed cloud computing service resource name meant for a target region may be:
am:aws-custom:ec2:custom-region-1:123456789012:instance/instance-id The emulation service may ensure that a cloud computing service resource name included in an API request generated by a system running in a client virtual private cloud and meant for a target region of a cloud computing service is in the correct format for that target region, and is, for example not in the standard format if the target region does not accept API requests in the standard format. If the API request includes a cloud computing service resource name that is in the standard format, the API request may not work with the target region of the cloud computing service and may fail during testing by the emulation service. Results of tests on the cloud computing service resource names performed by the emulation service may be stored in the data storage so that they may be viewable by users. A user may be able to view which tests or checks the API requests are failing, allowing errors in the system that is generating failed API requests to be corrected while the system is being used with the emulation system.

The emulation service may also inspect logs created by a region of the cloud computing service used to run a system that is intended to be switched to run on a target region, such as a custom or air-gapped region. The logs may include records of various events that occurred within the region of the cloud computing service, including any suitable details about those events. For example, the emulation service may examine records from the logs to determine if an action recorded in the record is valid in the target region. A record may include an event name. The emulation service may retrieve the event name from the record and compare it to a list of event names that are valid for the target region. Event names that may be invalid within a target region may be flagged, as they may indicate an action that, while valid in the region of the cloud computing service used to run the system, may be invalid in the target region.

The emulation service may also inspect the details of resources that a user may attempt to use in the target region to determine if those resources are valid for the target region. For example, the emulation service may use API requests that may return the details of resource types, for example, as a JavaScript Object Notation (JSON) object or in XML format. For example, the emulation service may examine the details of an existing instance used by a user to determine if that instance type is valid in the target region.

The emulation service may also inspect scripts written by users that may create resources. For example, a script may be written in JSON or YAML and may work with a service of the cloud computing service to create resources that may be used, for example, in the target region. The emulation service may inspect a script to ensure that the script will work in the target region and that the resources used by the script are valid in the target region. For example, the emulation service may check scripts for hardcoded ARNs, or resource names, that may only be valid for specific regions of a cloud computing service and may thus not be valid for the target region. The emulation service may check the script for service principals which may not be valid in the target region. The emulation service may check the script for the invocation of resources that may not be available in the target region.

The emulation service may also inspect source code for programs that a user may intend to run in a target region. For example, the source code may include code related to SDKs and JDKs provided by the cloud computing service. The emulation service may check this code to ensure that it includes valid resource names, valid endpoint configurations, valid services, valid actions, valid features, and valid parameters for the target region. For example, source code may include a code block with code referencing a specific region of the cloud computing service. This code block may not work in a target region.

The emulation service may manipulate received API requests which are meant for a target region of a cloud computing service in order to generate API requests that are valid for standard regions of that cloud computing service. The emulation service may extract attributes from a received API request, including, for example, host, parameters, header, body, path, query string, service name, and subdomain. These attributes of the received API request may be used to create an API request that is valid for standard regions of the cloud computing service.

For example, a received API request meant for a target region that is a custom or air-gapped region may include a cloud computing service resource name as part of its parameters. The cloud computing service resource name may be:
am:aws-custom:ec2:custom-region-1:123456789012:instance/instance-id
This cloud computing service resource name may only be valid when the API request is sent to the target region, the custom or air-gapped region of the cloud computing service that its generating system was intended to work with and may not be valid for standard regions of the cloud computing service. The emulation service may use this cloud computing service resource name to generate a cloud computing service resource name to be included in an API request that is valid for standard regions of the cloud computing service. The generated cloud computing service resource name may be:
am:aws:ec2:us-east-1:123456789012:instance/instance-id
The attributes of a received API request may by manipulated, modified, and edited in any suitable manner to generate an API request that is valid for standard regions of the cloud computing service.

By using received API requests meant for a target region of a cloud computing service to generate API requests that are valid for standard (non-custom/non-air-gapped) regions of that cloud computing service, the emulation service may allow a system intended to work with the target region to work with a standard region without requiring that the user system be modified. The standard region of the cloud computing service is used to provide the services that the system expects to receive from the target region. The system may behave as if it is running on the target region and may be unaware that its API requests are being sent to endpoints in a standard region of the cloud computing service that is not the target region.

The emulation service may manipulate API request responses received from standard regions of a cloud computing service to generate API request responses that appear to be from the target region of the cloud computing service. For example, a system running in a virtual private cloud may send an API request meant for a target region of a cloud computing service. The emulation service may receive and manipulate the API request to generate an API request that is valid for standard regions of the cloud computing service. This generated API request may be sent by the emulation system to the cloud computing service, which may process the API request using resources, such as servers, that are included in a standard region of the cloud computing service, and not using resources included in the target region as the target region may be a custom or air-gapped region that may not exist yet or be accessible, or may be a standard, commercial, or governmental region that the system has not been switched on to. The resources, such as servers, in the standard region of the cloud computing service may send an API request response to the emulation system. The API request response may be in a standard format and may thus not be a valid response for the system that sent the API request that was received by the emulation service and used to generate the API request sent to the standard region of the cloud computing service. The emulation service may manipulate the API request response to generate an API request response that is valid for the system that sent the API request. This generated API request response may then be sent to the system in the virtual private cloud by the emulation system and may appear to the system to have originated from the target region being emulated.

The emulation service may manipulate API request responses in any suitable manner. An API request response may include a number of attributes, including, for example, response headers and a response body, or payload. The response headers and response payload may include commercial values of attributes specific to the cloud computing service, such as regions, availability zones, and cloud computing service resource names, that are different or customized in the target region being emulated by the emulation system. The emulation service may manipulate the API request response to convert these values into the custom values that would be found in an API request response from resources, such as servers, in the target region. For example, an API request response may include a cloud computing service resource name. This cloud computing service resource name may be in the format for standard regions of the cloud computing service, and thus may not be in valid format for a target region being emulated, which may be a custom or air-gapped region. The cloud computing service resource name may be:
am:aws:rds:us-east-1:123456789012:db-instance-name
In order to return a cloud computing service resource name to the application that sent the API request that is valid for the target region being emulated for example, a custom or air-gapped region, the emulation service may generate the cloud computing service resource name:
am:aws-custom:ec2:custom-region-1:123456789012:instance/instance-id
This generated cloud computing service resource name may be included in a generated API request response. After the emulation service generates the API request response that is valid for the target region being emulated, the custom or air-gapped region, the generated API request response may be sent to the system that originally sent out the API request.

By receiving API requests from a system intended to work with a target region and generating API requests that can work with a standard region and receiving API request responses that are valid for a standard region and generating API request responses that are valid for the target region, the emulation system may provide a working target region emulator. This may allow users of the emulation system to test systems that are configured for the target region, which may be a custom or air-gapped region or other standard, commercial, or governmental region, which may reduce the number of changes that may be needed before the system is deployed in the target region. The attributes used in API request responses by the emulation system may be used in future, follow up API requests. This may allow users to test systems that are configured for the target region using the emulation system.

The emulation system may emulate all aspects of a target region. This may allow systems to operate at full functionality and capacity completely configured for a target region before the target region is created and before the systems are deployed to the target region.

A user may also use the emulation system to run systems meant for a target region even after the system is deployed for use with the target region. This may allow a user to troubleshoot the system or application within the emulation system, as the user may not have visibility to perform troubleshooting on the system while it is deployed for use with the target region. The emulation system may allow a custom configured version of the system to run at all times to use as a test bed for troubleshooting deployment issues.

A cloud computing service may use chunked uploads when receiving data from a user. An overall payload may need to be broken into multiple "chunks" of data, which may then be uploaded one at a time. Each chunk may need to be signed using a signature method accepted by the cloud computing service. The cloud computing service may not allow for an uploader to re-sign each separate chunk. To allow uploads from the emulation system to the cloud computing service, the emulation system may receive an entire payload, with all the chunks, and compile it into a single byte array. This may result in numerous signature lines within the binary file itself based on the method used for signature by the cloud computing service. The emulation system may parse the byte array, byte by byte, and remove the signature lines from the byte array and reconstruct the original binary file. After this binary file is reconstructed, the emulation system may complete the upload of the binary file to the cloud computing service. This may allow the emulation system to emulate chunked/streaming features of a cloud computing service.

The emulation system may use the federation service to allow for federated access to cloud computing services through use of a secure token service and assume role actions. The emulation system may allow users to receive temporary credentials, including an access key, secret key, and session token, to be used to access the client's account, or an account controlled by the emulation system, on a cloud computing service, through the federation service by use of cryptographic certificates, such as PKI Certificates. A client PKI Certificate may be possessed, for example, by the user or by the emulation system, through a prior exchange with a cloud computing service. The client PKI Certificate may be used in a request to the federation service APIs. The federation service API may use the information in the client PKI Certificate, specifically the Common Name (CN) and Distinguished Name (DN), to authenticate the sender of the request. Additionally, query string parameters which combined may identify the cloud computing service account and the cloud computing service role for which the user is requesting to get credentials for may be sent. The federation service may take the client PKI Certificate information and the query string parameters and use them to identify which cloud computing service account and cloud computing service role to assume, authenticate that the requester has the access rights to request the credentials, make an API Call to a secure token service to assume the role, receive the temporary credentials, and return the temporary credentials to the user.

The federation service may allow the emulation system to emulate access control methods and policies in target regions that are not available commercially, such as custom or air-gapped regions. This may also allow the emulation system to test multiple methods of cloud computing service access control outside of roles and access key/secret keys.

Because the emulation system may emulate endpoints that do not exist commercially, as they may be in custom or air-gapped regions of a cloud computing service, the emulation system may also provide TLS/SSL Server Certificates that are associated with these endpoints. In order to do this, the emulation system may maintain its own private certificate authority (CA), including root and intermediate certificates. These root and intermediate certificates may be provided to users of the emulation system. This may enable systems and applications run by users in client virtual private clouds of the emulation system to create valid TLS/SSL connects against the custom endpoints. This may also enable the emulation system to emulate an air-gapped region that does not have access to the Internet and thus does not have the ability to use commercially available CAs.

A cloud computing service may use path-style and virtual-hosted-style URLs. Virtual-hosted-style URLs may include bucket names as part of the domains as a subdomain. Server certificates may only have one level of sub-domain in the CN, so the emulation system may use two separate server certificates for service endpoints.

The portal of the emulation system may be a public facing portal with a GUI that enables users to interface with the emulation system, creating user and account profiles, project profiles, subscription details, viewing request detail information, and so on. The portal of the emulation system may be separate from other components of the emulation system but may be able to access the same data stores and search engines as the other components. The portal may include a number of features, including user registration, company/account management, subscription management, project management, an API request dashboard, and client virtual private cloud creation and management.

The portal of the emulation system may allow for user registration. This may enable the users of the emulation system to create individual user accounts. These user accounts may be tied to a user profile which stores information specific to an individual user.

The portal of the emulation system may allow for company/account management. A company/account may be associated with a single customer who wants to test one or more systems/projects and may have one or more users associated with it. Company/account management may be a grouping mechanism that may be a parent to both projects and users. Users associated with a company/account, with proper permissions, may manage company/account details, including, for example, managing users, managing projects, and managing subscriptions.

The portal of the emulation system may allow for subscription management. This may allow users to purchase and manage subscriptions for their use of the emulation system. Subscriptions may be associated with a company/accounts.

The portal of the emulation system may allow for project management. Projects may be individual systems that the emulation system may be used to test against a target region through emulation of that target region. Projects may contain an individual Classless Inter-Domain Routing (CIDR) block and the ability to view API requests associated with the project and associated CIDR Block.

The portal of the emulation system may allow for access to an API Request Dashboard. The API Request Dashboard may allow users to view how their system is performing with the emulated target region. The API Request dashboard may show the details of each individual API request generated by the user's system that went through the emulation service and either passed or failed the tests and checks performed by the emulation service. The tests may provide three results after failing: a description of what failed, the specific object that failed, and remediation details users may use to potentially fix the issue. Users may be able to view what specific API calls and parameters are being passed and which ones will fail with the target region. This may enable users to debug their system and see exactly what is failing and what to fix without needing to use trial an error, thereby reducing the resources needed to test and fix the system.

The portal of the emulation system may allow for client virtual private cloud creation and management. This may allow for the creation of a client virtual private cloud that can be used by user to test their systems with an emulated target region. Through the portal, users may launch a client virtual private cloud that is owned by the emulation system and pre-configured to interface with the emulation services of the emulation system. The client virtual private cloud may be hosted on the cloud computing service. Alternatively, if the user wants to own their system and not share their product, they may create a client virtual private cloud in their own account on the cloud computing service and associate it with the emulation services of the emulation system.

A client virtual private cloud created on the emulation system may have its DHCP settings set to point DNS queries to the DNS service of the emulation system. This may ensure that all cloud computing service instances launched in the client virtual private cloud will be configured to use the DNS service of the emulation system for all name resolution requests. This may allow the emulation system to control where requests, such as API requests from the system, are being routed and to resolve endpoints that do not exist commercially, for example, endpoints that are part of a custom or air-gapped region that may not yet exist on the cloud computing service.

The DNS service of the emulation system may provide DNS services that are controlled by the emulation system. The namespace of the DNS service of the emulation system may include names belonging to target regions, including, for example, custom or air-gapped cloud computing service regions that may not yet be set up. The names may be added to the DNS service by the emulation system based on data received from users of the emulation system. The names may correspond to target regions of a cloud computing service. Client virtual private clouds used to test systems meant to work with target regions of a cloud computing service may be configured to send DNS queries to the DNS service of the emulation system. The DNS query may include names that correspond to endpoints in the target region of the cloud computing service that the system is designed to work with. The DNS service may resolve these names in the DNS queries from the client virtual private clouds to IP addresses that belong to the emulation system. This may ensure that API requests sent out by the system the user is testing in the client virtual private cloud which are meant to be sent to endpoints in the target region of the cloud computing service are instead directed to the emulation system, where they may be processed by the emulation service.

When a project is created it may be associated with a unique CIDR block that does not collide with any other existing CIDR blocks associated with the emulation system. The CIDR block may be associated with the client virtual private cloud, which may result in all requests from the client virtual private cloud coming from a source IP within the CIDR block. This may allow the emulation system to associate API requests with their specific project or system based on the source IP address of the API requests.

The emulation system may allow a user to use their own cloud computing service account and virtual private cloud to run their system. The emulation system may provide scripts that a user may run in their own cloud computing service account that may create a virtual private cloud, with associated CIDR Block, and configure the DHCP settings to point to the DNS service of the emulation system.

The emulation system may be implemented as Software-as-a-Service (SaaS), Platform as a Service (PaaS), or as an on-premises application. For example, the emulation system may be made available to a user as software that the user may install on their own hardware or may be provided already installed on pre-configured hardware.

FIG. 1 shows an example system suitable for emulation of cloud computing service regions according to an implementation of the disclosed subject matter. An emulation system computing device 100 may include a portal 110, an emulation service 120, a DNS service 130, a federation service 150, and a storage 140. The emulation system computing device 100 may be any suitable computing device, such as, for example, a computer 20 as described in FIG. 8, or component thereof, for implementing the portal 110, the emulation service 120, the DNS service 130, the federation service 150, and the storage 140. The emulation system computing device 100 may be a single computing device, or may include multiple connected computing devices, and may be, for example, a laptop, a desktop, an individual server, a server farm, or a distributed server system, or may be a virtual computing device or system. The emulation system computing device 100 may be part of a computing system and network infrastructure or may be otherwise connected to the computing system and network infrastructure. The emulation system computing device 100 may, for example, be implemented on server systems which may be remotely accessed by users who wish to test systems meant for target cloud computing service regions. The emulation system computing device 100 may, for example, run on a virtual private cloud hosted on a cloud computing service. The emulation system computing device 100 may work and manage, for example, several virtual private clouds on the cloud computing service. Virtual private clouds may be isolated environments on a cloud computing service that may be used to test systems on emulated target regions of a cloud computing service. The virtual private clouds may be hosted on the same cloud computing service that the emulation system computing device 100 will emulate target regions of The portal 110 may be any suitable combination of hardware and software on the emulation system computing device 100 for implementing a public facing user interface that allows users to access the emulation system computing device 100 and the virtual private clouds managed by the emulation system computing device 100. The portal 110 of the emulation system computing device 100 may be a public facing portal 110 with a GUI that enables users to interface with the emulation system computing device 100, creating user and account profiles, project profiles, subscription details, viewing request detail information, and so on. The portal 110 of the emulation system computing device 100 may be separate from other components of the emulation system computing device 100 but may be able to access the same data stores and search engines as the other components of the emulation system computing device 100. The portal 110 may be implemented as a serverless application. The portal 110 may include a number of features, including user registration, company/account management, subscription management, project management, an API request dashboard, and client virtual private cloud creation and management. The portal 110 of the emulation system computing device 100 may allow for user registration. This may enable the users of the emulation system computing device 100 to create individual user accounts. These user accounts may be tied to a user profile which stores information specific to an individual user. The portal 110 of the emulation system computing device 100 may allow for company/account management. A company/account may be associated with a single customer who wants to test one or more systems/projects and may have one or more users associated with it. Company/account management may be a grouping mechanism that may be a parent to both projects and users. Users associated with a company/account, with proper permissions, may manage company/account details, including, for example, managing users, managing projects, and managing subscriptions. The portal 110 of the emulation system computing device 100 may allow for subscription management. This may allow users to purchase and manage subscriptions for their use of the emulation system computing device 100. Subscriptions may be associated with a company/accounts. The portal 110 of the emulation system computing device 100 may allow for project managements. Projects may be individual systems that the emulation system computing device 100 may be used to test against a target region through emulation of that target region. Projects may contain an individual CIDR block and the ability to view API requests associated with the project and associated CIDR Block.

The portal 110 of the emulation system computing device 100 may allow for access to an API Request Dashboard. The API Request Dashboard may allow users to view how their system is performing with the emulated target region. The API Request dashboard may show the details of each individual API request generated by the user's system that went through the emulation service and either passed or failed the tests and checks performed by the emulation service. The tests may provide three results after failing: a description of what failed, the specific object that failed, and remediation details users can use to potentially fix the issue. The name of a test may be listed along with the results of the test. Users may be able to view what specific API calls and parameters are being passed and which ones will fail with the target region. This may enable users to debug their system and see exactly what is failing and what to fix without needing to use trial and error, thereby reducing the resources needed to test and fix the system.

The portal 110 of the emulation system computing device 100 may allow for client virtual private cloud creation and management. This may allow for the creation of a client virtual private cloud that can be used by users to test their systems with an emulated target region. Through the portal 110, users may launch a client virtual private cloud that is owned by the emulation system computing device 100 and pre-configured to interface with the emulation services of the emulation system computing device 100. The client virtual private cloud may be hosted on the cloud computing service. Alternatively, if the user wants to own their system and not share their product, they may create a client virtual private cloud in their own account on the cloud computing service and associate it with the emulation services of the emulation system computing device 100.

The emulation service 120 may be any suitable combination of hardware and software on the emulation system computing device 100 computing device 100 for emulating target regions of a cloud computing service for users of the emulation system computing device 100. The emulation service 120 may be implemented as a set of application programming interfaces (APIs) which may emulate the APIs of cloud computing services. The emulation service 120 may be able to receive API requests, or API calls, meant for a target region of a cloud computing service, perform suitable testing of the received API requests, and return responses to received API requests to the originator of the API requests that include valid results.

The emulation service 120 may ensure that a cloud computing service resource name included in an API request generated by a system running in a client virtual private cloud and meant for a target region of a cloud computing service is in the correct format for a target region. The emulation service 120 may also inspect logs created by a user's system on a standard region. For example, a user may have a system operating on a standard region that they intend to operate on a target region, such as, for example a custom or air-gapped region. The logs may include records of various events that occurred within the standard region, including any suitable details about those events. The emulation service 120 may also inspect the details of resources that a user may attempt to use in the target region to determine if those resources are valid for the target region. For example, the emulation service may use API requests that may return the details of resource types, for example, as a JavaScript Object Notation (JSON) object or in XML format. For example, the emulation service may examine an instance type in the details returned for a resource to determine if that instance type is valid in the target region. The emulation service 120 may also inspect scripts written by users that may create resources. For example, a script may be written in JSON or YAML and may work with a service of the cloud computing service to create resources that may be used, for example, in the target region. The emulation service 120 may inspect a script to ensure that the script will work in the target region and that the resources created by the script are valid in the target region. The emulation service 120 may also inspect source code for programs that a user may intend to run in a target region. For example, the source code may include code related to SDKs and JDKs provided by the cloud computing service. The emulation service 120 may check this code to ensure that it includes valid resource names, valid endpoint configurations, valid services, valid actions, valid features, and valid parameters for the target region. The emulation service 120 may manipulate received API requests which are meant for target regions of a cloud computing service in order to generate API requests that are valid for standard regions of that cloud computing service. The emulation service 120 may extract attributes from a received API request, including, for example, host, parameters, header, body, path, query string, service name, and subdomain. These attributes of the received API request may be used to create an API request that is valid for standard regions of the cloud computing service.

By using received API requests meant for a target region of a cloud computing service to generate API requests that are valid for standard (non-custom/non-air-gapped) regions of that cloud computing service, the emulation service 120 may allow a system intended to work with the target region to work with a standard region without requiring that the user system be modified. The standard region of the cloud computing service may be used to provide the services that the system expects to receive from the target region. The system may behave as if it is running on the target region and may be unaware that its API requests are being sent to endpoints in a standard region of the cloud computing service that is not the target region.

The emulation service 120 may manipulate API request responses received from standard regions of a cloud computing service to generate API requests responses that appear to be from target regions of the cloud computing service. For example, a system running in a virtual private cloud may send an API request meant for a target region of a cloud computing service. The emulation service 120 may receive and manipulate the API request to generate an API request that is valid for standard regions of the cloud computing service. This generated API request may be sent by the emulation system computing device 100 to the cloud computing service, which may process the API request using resources, such as servers, that are included in a standard region of the cloud computing service. The resources, such as servers, in the standard region of the cloud computing service may send an API request response to the emulation system computing device 100. The API request response may be in a standard format and may thus not be a valid response for the system that sent the API request that was received by the emulation service 120 and used to generate the API request sent to the standard region of the cloud computing service. The emulation service 120 may manipulate the API request response to generate an API request response that is valid for the system that sent the API request. This generated API request response may then be sent to the system in the virtual private cloud by the emulation system computing device 100 and may appear to the system to have originated from the target region being emulated.

The DNS service 130 may be any suitable combination of hardware and software on the emulation system computing device 100 computing device 100 for resolving the address requests for cloud servers in target regions. The DNS service 130 of the emulation system computing device 100 may be separate from Internet DNS servers, and may only resolve addresses related to target regions for cloud computing services that are being emulated. A client virtual private cloud created by the emulation system computing device 100, or a client virtual private cloud created and owned by a user of the emulation system computing device 100, may have its DHCP settings set to point DNS queries to the DNS service 130 of the emulation system computing device 100. This may ensure that all cloud computing service instances launched in the client virtual private cloud will be configured to use the DNS service 130 of the emulation system computing device 100 for all name resolution requests. This may allow the emulation system computing device 100 to control where requests, such as API requests from the system, are routed and to resolve endpoints that do not exist commercially, for example, endpoints that are part of target region that may not yet exist on the cloud computing service. The namespace of the DNS service 130 of the emulation system computing device 100 may include names belonging to target cloud computing service regions. The names may be added to the DNS service 130 by the emulation system computing device 100 based on data received from users of the emulation system computing device 100. The names may correspond to target regions of a cloud computing service.

The federation service 150 may be any suitable combination of hardware and software on the emulation system computing device 100 computing device 100 for providing access to a cloud computing service through the use of cryptographic certificates. The federation service 150 may, for example, allow the emulation system computing device 100 to access a cloud computing service using a PKI certificate which may belong to a user of the emulation system computing device 100 or may belong to the emulation system computing device 100. The emulation system computing device 100 may use the federation service 150 to allow for federated access to cloud computing services through use of a secure token service and assume role actions. The emulation system computing device 100 may allow users to receive temporary credentials, including an access key, secret key, and session token, to be used to access the client's account, or an account controlled by the emulation system computing device 100, on a cloud computing service, through the federation service 150 by use of cryptographic certificates, such as PKI Certificates. A client PKI Certificate may be possessed, for example, by the user or by the emulation system computing device 100 through a prior exchange with a cloud computing service. The client PKI Certificate may be used in a request to the federation service 150 APIs. The federation service 150 API may use the information in the client PKI Certificate, specifically the CN and DN, to authenticate the sender of the request. Additionally, query string parameters which combined may identify the cloud computing service account and the cloud computing service role which the user is requesting to get credentials for may be sent. The federation service 150 may take the client PKI Certificate information and the query string parameters and use them to identify which cloud computing service account and cloud computing service role to assume, authenticate that the requester has the access rights to request the credentials, make an API Call to a secure token service to assume the role, receive the temporary credentials, and return the temporary credentials to the user. The federation service 150 may allow the emulation system to emulate access control methods and policies in target regions that are not available commercially. This may also allow the emulation system to test multiple methods of cloud computing service access control outside of roles and access key/secret keys.

The storage 140 may be any suitable hardware storage with any suitable software on, or accessible to, the emulation system computing device 100, and may store any suitable data for the emulation system computing device 100, including, for example, user data and account data, and the results of tests performed by the emulation service 120 on API requests, logs, resource details, scripts, and source code. A user may be able to view, from the storage 140, which tests or checks the API requests, logs, resource details, scripts, and source code are failing. The emulation system computing device 100 may include a search engine which may store and index API requests received by the emulation service so that users may search through their previous API requests stored in the storage 140. The storage 140 may, for example, be any suitable combination of volatile and non-volatile memory.

Figure 2A:
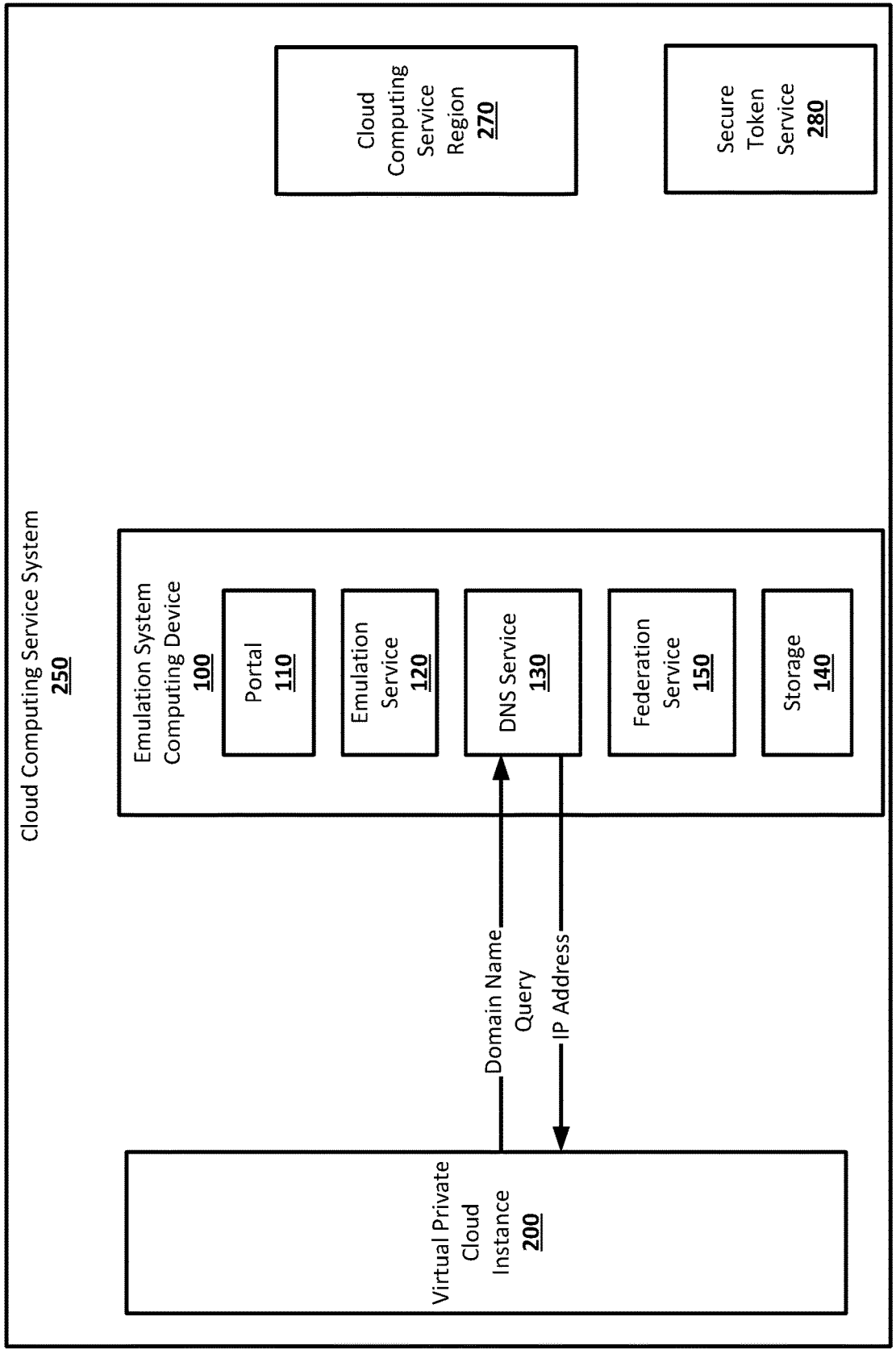
FIG. 2A shows an example arrangement suitable for emulation of cloud computing service regions according to an implementation of the disclosed subject matter.

FIG. 2A shows an example arrangement suitable for emulation of cloud computing service regions according to an implementation of the disclosed subject matter. A virtual private cloud instance 200 may make a domain name query. The virtual private cloud instance 200 may be, for example, an isolated environment on a cloud computing service system 250 that may be used to test systems on emulated target regions of a cloud computing service, such as an instance in a client virtual private cloud or virtual private cloud owned by a user of the emulation system computing device 100. The cloud computing service system 250 may be any suitable computing system, including any suitable combination of hardware and software, for implementing a cloud computing service. The virtual private cloud instance 200 may be hosted on the cloud computing service system 250. The cloud computing service system 250 may also host the emulation system computing device 100, which may be also be implemented in a virtual private cloud. A user may use the virtual private cloud instance 200 to run a system or application that may be designed to work with a target region of the cloud computing service system 250. A cloud computing service region 270 may be a standard region of the cloud computing service system 250. The emulation system computing device 100 may use the cloud computing service region 270 in the emulation of a target region, such as a custom or air-gapped region that may not yet be setup or may be otherwise inaccessible for the system being tested on the virtual private cloud instance 200. A secure token service 280 of the cloud computing service system 250 may be used to provide credentials, including temporary credentials, that may allow access to the resources of the cloud computing service system 250.

The virtual private cloud instance 200 may be, for example, created and managed by the emulation system computing device 100, or may be separate from the emulation system computing device 100, for example, being owned and managed by a user of the emulation system computing device 100. The virtual private cloud instance 200 may have its DHCP settings set to point DNS queries to the DNS service 130 of the emulation system computing device 100. This may ensure that all cloud computing service instances launched in the virtual private cloud instance 200 will be configured to use the DNS service 130 of the emulation system computing device 100 for all name resolution requests.

The system or application running on the virtual private cloud instance 200 may generate API requests that are meant to be transmitted to computing devices that form a target region of the cloud computing service system 250. These computing devices may be endpoints for the cloud computing service system 250. The virtual private cloud instance 200 may perform a DNS query to resolve the IP address of the domain name included in the API request. The DNS query may be directed to the DNS service 130 of the emulation system computing device 100, rather than to a public DNS service, based on the DHCP settings of the virtual private cloud instance 200. The DNS service 130 of the emulation system computing device 100 may resolve the address of an endpoint specified in the API request to an IP address belonging to the emulation system computing device 100. This IP address may be returned to the virtual private cloud instance 200.

Figure 2B:
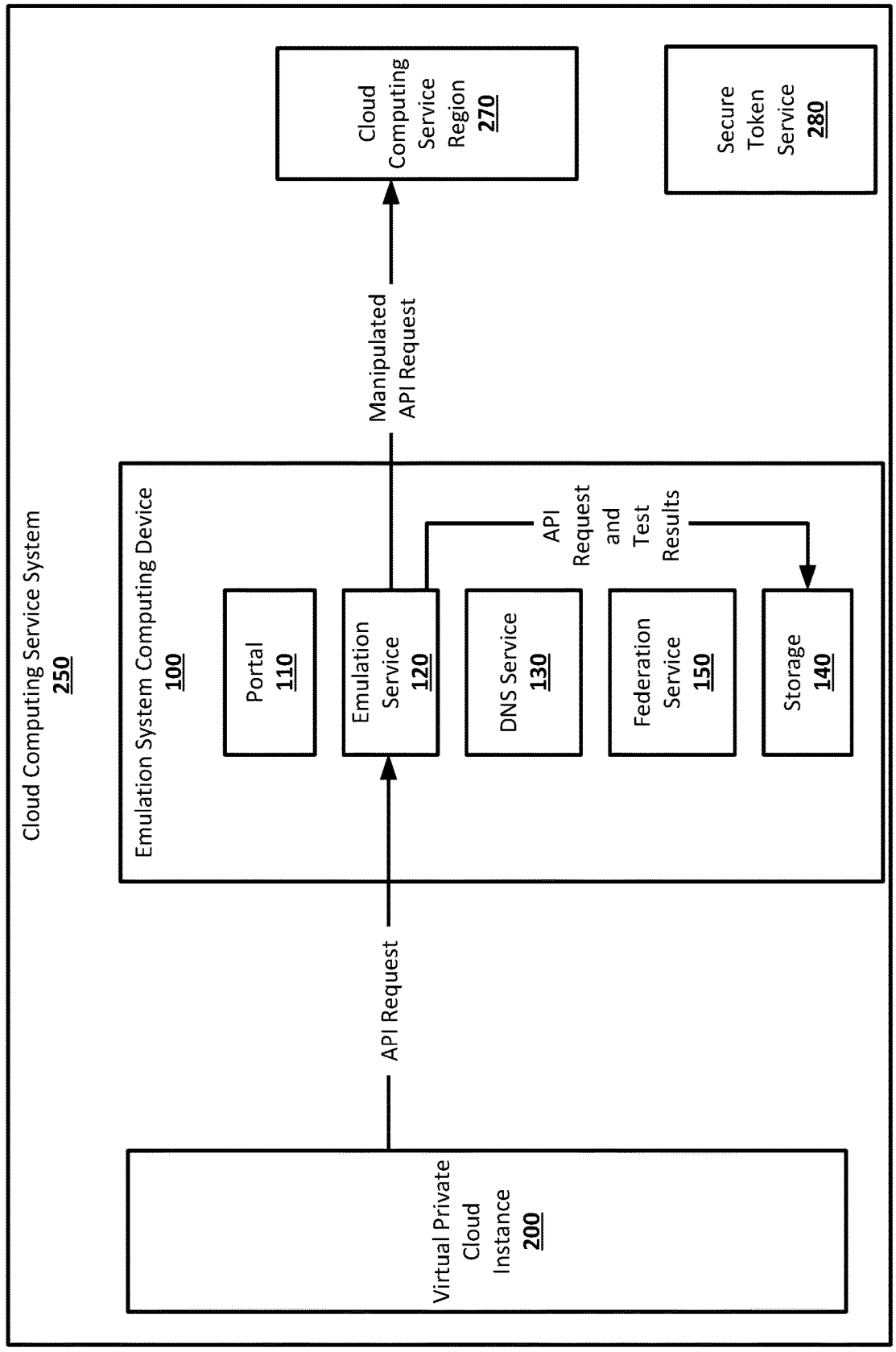
FIG. 2B shows an example arrangement suitable for emulation of cloud computing service regions according to an implementation of the disclosed subject matter.

FIG. 2B shows an example arrangement suitable for emulation of cloud computing service regions according to an implementation of the disclosed subject matter. The virtual private cloud instance 200 may send the API request to the IP address received from the DNS service 130. This may result in the API request being routed to the emulation system computing device 100.

The emulation service 120 may inspect the API request, for example, running any suitable number of tests and checks on the API request, including tests that may have been customized by the user of the virtual private cloud instance 200 through, for example, the portal 110. Tests run on API requests may include, for example, an Action_Not_Available test, an Attempt_To_Reach_Internet test, and Incorrect_Availability_Zone test, an Incorrect_Signature_Region test, an Invalid_ARN_Format test, an Invalid_Equipment test, and Invalid_Parameter_Value test, a Parameter_Not_Supported test, a Service_Not_Available test, an Invalid_Principal, and an Invalid_Resource test. The API request may include a cloud computing service resource name. The cloud computing service resource name may be included in a header, parameters, query string, URL, or body of the API request. The emulation service 120 may test the cloud computing service resource name to determine whether it is in the correct format to be used with the target region being emulated. For example, a standard cloud computing service resource name may be formatted as:
servicern:partition:service:region:account-id:resource
servicern:partition:service:region:account-id:resourcetype/resource
servicern:partition:service:region:account-id:resourcetype:resource "servicern" may be an indication that the statement is a cloud computing service resource name and may identify the cloud computing service where the resource is located, for example, by company name, "partition" may specify a partition of the cloud computing service where the resource is located, "service" may specify the service of the cloud computing service that include the resource, "region" may specify the region of the cloud computing service where resource is located, "account-id" may identify the account holder sending the API request that will use the resource, and "resource" and "resourcetype" may be used to identify the resource. For example, a completed cloud computing service resource name may look like:
am:aws:ec2:us-east-1:123456789012:instance/instance-id When a target region of a cloud computing service is used, the cloud computing service resource name included an API request meant for the target region may need to be customized. For example, a completed cloud computing service resource name meant for a target region that may be a custom or air-gapped region may be:
am:aws-custom:ec2:custom-region-1:123456789012:instance/instance-id The emulation service 120 may ensure that a cloud computing service resource name included in an API request receive from the virtual private cloud instance 200 and meant for a target region of the cloud computing service system 250 is in the correct format for the target region and is not in the standard format. If the API request includes a cloud computing service resource name that is in the standard format, the API request may not work with a target region and may fail during testing by the emulation service 120. Results of tests on the API request performed by the emulation service 120 may be stored in the storage 140 along with the API request itself. The test results and API requests stored in the storage 140 may be viewable by the users of the virtual private cloud instance 200 and may be searched using a search engine provided by the emulation system computing device 100. A user may be able to view which tests or checks the API requests are failing, allowing errors in the system on the virtual private cloud instance 200 that is generating failed API requests to be corrected while the system is being used with the emulation system computing device 100.

The emulation service 200 may manipulate the received API request, which may be meant for a target region of the cloud computing service system 250, to generate an API request that may be valid for the cloud computing service region 270, which may be a standard region of the cloud computing service system 250. The emulation service 120 may extract attributes from a received API request, including, for example, host, parameters, header, body, path, query string, service name, and subdomain. These attributes of the received API request may be used to create an API request that may be valid for the cloud computing service region 270 of the cloud computing service system 250.

For example, the received API request meant for a target region may include a cloud computing service resource name as part of its parameters. The cloud computing service resource name may be:
am:aws-custom:ec2:custom-region-1:123456789012:instance/instance-id This cloud computing service resource name may only be valid when the API request is sent to the target region of the cloud computing service system 250 and may not be valid for standard regions, such as the cloud computing service region 270, of the cloud computing service system 250. The emulation service 120 may use this cloud computing service resource name to generate a cloud computing service resource name to be included in a manipulated API request that may be valid for the cloud computing service region 270. The generated cloud computing service resource name may be:

am:aws:ec2:us-east-1:123456789012:instance/instance-id

The attributes of a received API request may by manipulated, modified, and edited in any suitable manner to generate a manipulated API request that may be valid for the cloud computing service region 270.

The manipulated API request generated by the emulation service 120 may be sent to the cloud computing service region 270. By manipulating an API request meant for a target region of the cloud computing service system 250 to generate a manipulated API request that may be valid for the cloud computing service region 270, which may not be the custom or gapped-region, the emulation service 120 may allow a system on the virtual private cloud instance 200 intended to work with the target region to work with the cloud computing service region 270 without requiring that the system on the virtual private cloud instance 200 be modified. The cloud computing service region 270 may be used to provide the services that the system on the virtual private cloud instance 200 expects to receive from the target region. The system on the virtual private cloud instance 200 may behave as if it is running on the target region and may be unaware that its API requests are being sent to endpoints in the cloud computing service region 270.

Figure 2C:
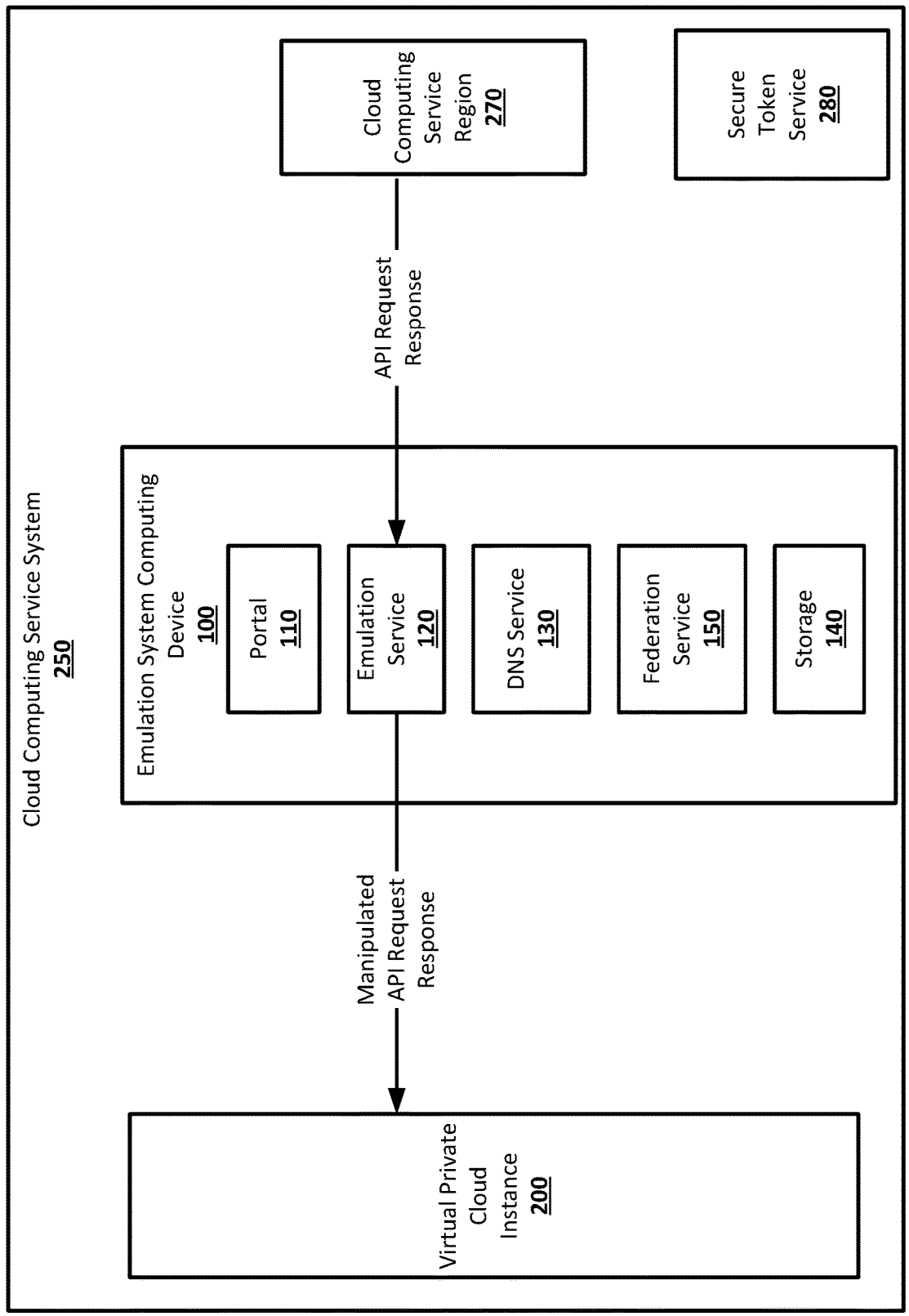
FIG. 2C shows an example arrangement suitable for emulation of cloud computing service regions according to an implementation of the disclosed subject matter.

FIG. 2C shows an example arrangement suitable for emulation of cloud computing service regions according to an implementation of the disclosed subject matter. The cloud computing service region 270 may receive the manipulated API request from the emulation system computing device 100 and may fulfill the manipulated API request. The cloud computing service region 270 may process the manipulated API request using resources, such as servers, that are included in a cloud computing service region 270. The resources, such as servers, in the cloud computing service region 270, may send an API request response to the emulation system computing device 100. The API request response may be in a standard format and may thus not be a valid response for the system on the virtual private cloud instance 200 that sent the API request that was received by the emulation service 120 and used to generate the manipulated API request. The API request response may include any suitable data that may be responsive to the manipulated API request and may therefore also be responsive to the original API request sent from the virtual private cloud server system 200 to the emulation system computing device 100.

The emulation service 120 may manipulate the API request response to generate a manipulated API request response that may be valid for the system on the virtual private cloud instance 200 that sent the API request to the emulation system computing device 100. This generated manipulated API request response may then be sent to the system in the virtual private cloud instance 200 by the emulation system computing device 100 and may appear to the system to have originated from the target region being emulated instead of from the cloud computing service region 270.

The emulation service 120 may manipulate API request responses in any suitable manner. An API request response may include a number of attributes, including, for example, response headers and a response body, or payload. The response headers and response payload may include commercial values of attributes specific to the cloud computing service system 250, such as regions, availability zones, and cloud computing service resource names, that are different or customized in the target environment being emulated by the emulation system computing device 100. The emulation service 120 may manipulate the API request response to convert these values into the custom values that would be found in an API request response from resources, such as servers, in the target region. For example, an API request response may include a cloud computing service resource name. This cloud computing service resource name may be in the format for standard regions, such as the cloud computing service region 270, of the cloud computing service system 250, and thus may not be in valid format for the target region being emulated. The cloud computing service resource name may be:

am:aws:rds:us-east-1:123456789012:db-instance-name

In order to return a cloud computing service resource name to the system on the virtual private cloud instance 200 that sent the API request that is valid for the target region being emulated, the emulation service 120 may generate the cloud computing service resource name:

am:aws-custom:ec2:custom-region-1:123456789012:instance/instance-id

This generated cloud computing service resource name may be included in a generated manipulated API request response. After the emulation service 120 generates the manipulated API request response that is valid for the target region being emulated, the generated manipulated API request response may be sent from the emulation system computing device 100 to the virtual private cloud instance 200 that originally sent out the API request for use by the system running on the virtual private cloud instance 200.

Figure 3:
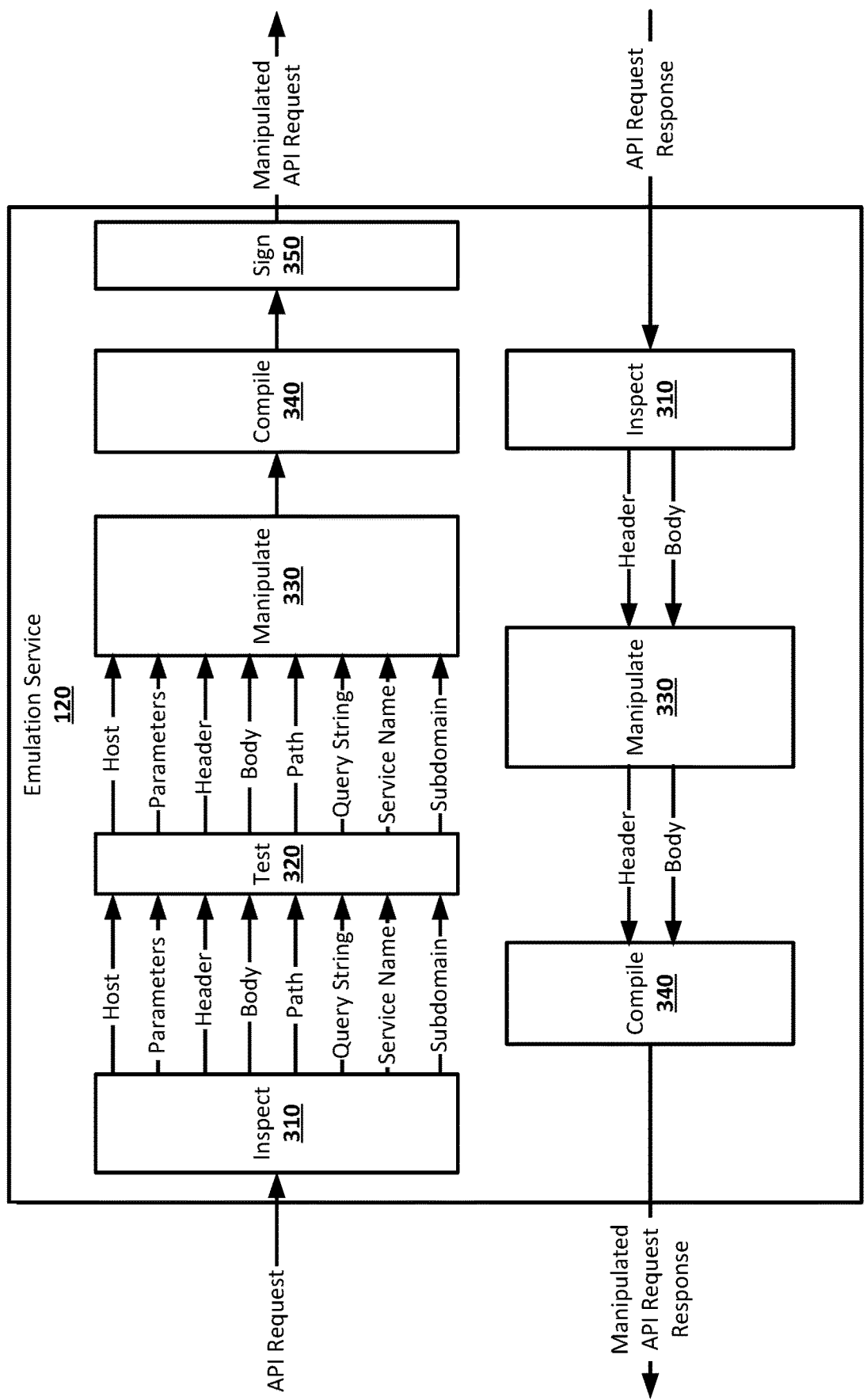
FIG. 3 shows an example arrangement suitable for emulation of cloud computing service regions according to an implementation of the disclosed subject matter.

FIG. 3 shows an example arrangement suitable for emulation of cloud computing service regions according to an implementation of the disclosed subject matter. The emulation service 120 of the emulation system computing device 100 may receive an API request, for example, from the virtual private cloud instance 200. The emulation system computing device 100 may receive all traffic intended for all subdomains, paths, and query strings for the target region being emulated.

An inspect component 310 of the emulation service 120 may inspect the received API request. The inspect component 310 may be implemented as, for example, any suitable software that may be part of the emulation service 120. The inspect component 310 may inspect the API request and pull out all attributes of the API request payload including, for example, a host name, parameters, headers, the body, a path, a query string, a URI, a URL, a service name, and a subdomain.

A test component 320 of the emulation service 120 may perform any suitable test on the attributes of the API request pulled out by the inspect component 310. The test component 320 may be implemented as, for example, any suitable software that may be part of the emulation service 120. The test component 320 may, for example, run any suitable tests and checks on the various attributes of the API request to determine whether they are appropriate for use in a target region. The API request may be rejected if attributes of the API request fail any tests or checks performed by the test component 320, which may result, for example, in the emulation service 120 rejecting the API request and generating a 400 HTML, response which may include information as to what attribute of the API request failed, why it failed, and how the failure may be remediated. If the API request is not rejected, the attributes of the API request may be passed on to be used to generate a manipulated API request.

Results of tests and checks performed by the test component 320 may be stored, along with the API request, in the storage 140 so that may be retrieved and displayed to a user at a later time.

A manipulate component 330 of the emulation service 120 may perform any suitable manipulation of the attributes of the API request pulled out by the inspect component 310. The manipulate component 330 may be implemented as, for example, any suitable software that may be part of the emulation service 120. The manipulate component 330 may, for example, manipulate and replace the parameters and metadata of the API request pulled out by the inspect component 310 that are associated with the target region and associated endpoints so that those parameters and metadata instead refer to a standard region that exists, for example, the cloud computing service region 270 and its associated endpoints. This may result in the attributes of the API request being manipulated so that they will work with, for example, the cloud computing service region 270 instead of the target region for which the API request was intended.

A compile component 340 of the emulation service 120 may perform any suitable compilation of the attributes of the API request manipulated by the manipulate component 330. The compile component 340 may be implemented as, for example, any suitable software that may be part of the emulation service 120. The compile component 340 may, for example, compile the manipulated attributes of the API request to generate a manipulated API request. The manipulated API request may be an API request that is valid in a standard region, such as, for example, the cloud computing service region 270.

A sign component 350 of the emulation service 120 may sign the manipulated API request generated by the compile component 340. The sign component 350 may be implemented as, for example, any suitable software that may be part of the emulation service 120. The sign component 350 may, for example, sign the manipulated API request using a signature algorithm associated with the cloud computing service system 250. The manipulated API request may then be sent to, for example, the cloud computing service region 270 as a valid API request for the cloud computing service region 270.

The emulation service 120 of the emulation system computing device 100 may receive an API request response, for example, from the cloud computing service region 270. The API request response may be received in response to a manipulated API request sent from the emulation system computing device 100 to the cloud computing service region 270.

The inspect component 310 of the emulation service 120 may inspect the received API request response. The inspect component 310 may inspect the API request response and pull out attributes of the API request response such as, for example, the headers and the body.

The manipulate component 330 of the emulation service 120 may manipulate and replace attributes of the API request response pulled out by the inspect component 310. For example, the manipulate component 330 may manipulate and replace the headers and body of the API request response so that values which are valid for the cloud computing service region 270 are converted into customs values that are valid for the target region that the API request was intended for.

The compile component 340 of the emulation service 120 may perform any suitable compilation of the attributes of the API request response manipulated by the manipulate component 330. The compile component 340 may, for example, compile the manipulated attributes of the API request response 340 to generate a manipulated API request response. The manipulated API request response may be an API request response that may appear to have been generated by a target region for which the API request was intended instead of a standard region, such as, for example, the cloud computing service region 270. The manipulated API request response may be sent, for example, to the virtual private cloud instance 200 as a valid API request response to the API request sent out by the virtual private cloud instance 200 and generated by the system running on the virtual private cloud instance 200.

Figure 4:
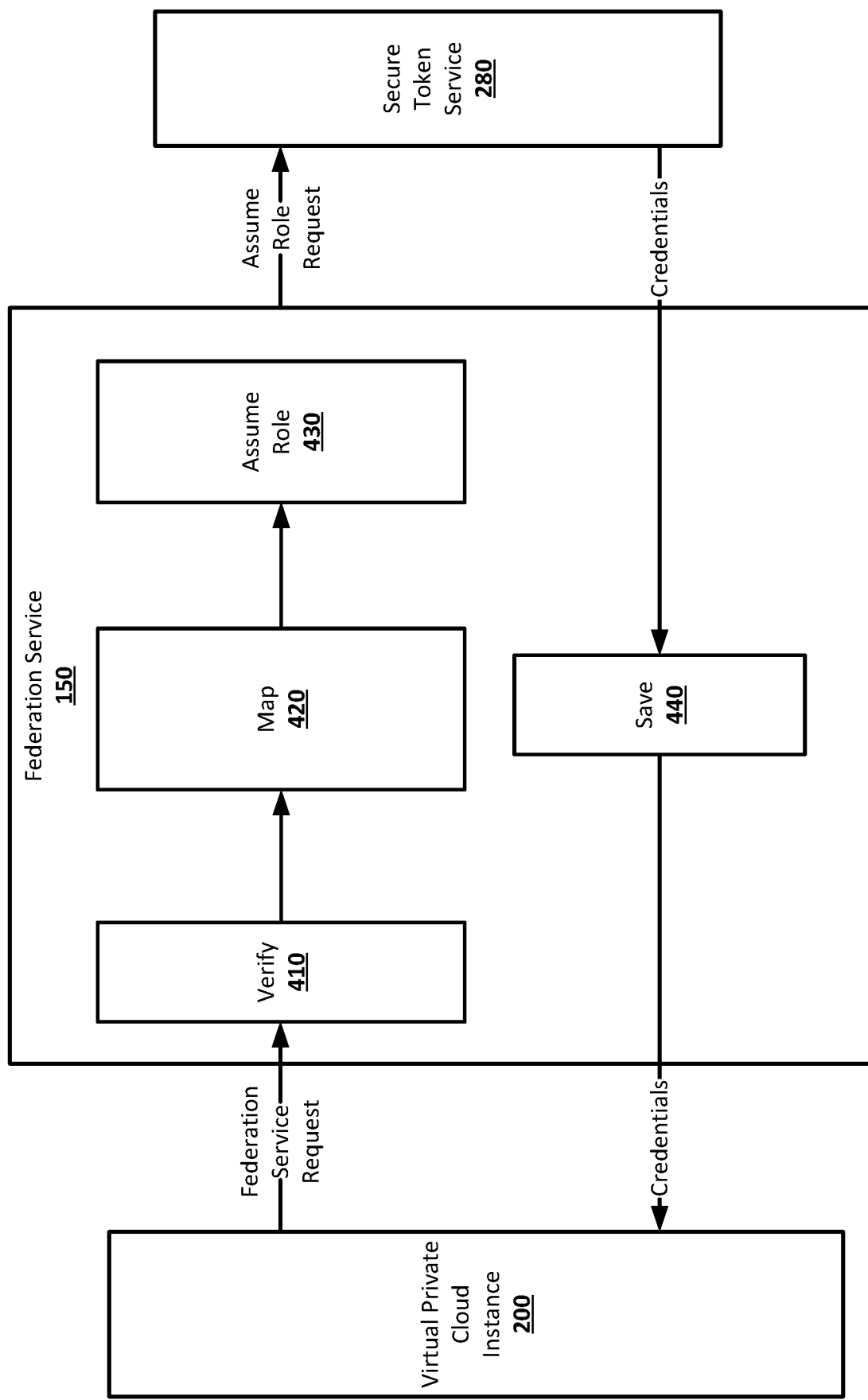
FIG. 4 shows an example arrangement suitable for emulation of cloud computing service regions according to an implementation of the disclosed subject matter.

FIG. 4 shows an example arrangement suitable for emulation of cloud computing service regions according to an implementation of the disclosed subject matter. The emulation system computing device 100 may use the federation service 150 to allow for federated access to the cloud computing service system 250. The federation service 150 may receive a federation service request, which may be in the form of an API call or request, from the virtual private cloud instance 200.

A verify component 410 of the federation service 150 may verify the federation service request. The verify component 410 may be implemented as, for example, any suitable software that may be part of the federation service 150. The verify component 410 may, for example, verify PKI Certificate information and DN and CN from the federation service request. The verify component 410 may have access to query string parameters passed in the federation service request. The PKI Certificate information may be from a PKI Certificate the may belong to a user of the virtual private cloud instance 200 or to the emulation system computing device 100. The CN and DN may be used to authenticate the sender of the federation service request.

A map component 420 of the federation service 150 may map parameters and their values from the federation service request to an account and a role. The map component 420 may be implemented as, for example, any suitable software that may be part of the federation service 150. The map component 420 may, for example, map the parameters and their values from the federation service request to an account on the cloud computing service system 250 and an identity and access management (IAM) role that may have been pre-associated prior to the federation service request. The account and role may be stored in a federation datastore, for example, as part of the storage 140, that the federation service 150 may have has access to.

An assume role component 430 of the federation service 150 may make an assume roll call to the cloud computing service system 250, for example, to the secure token service 280. The assume role component 420 may be implemented as, for example, any suitable software that may be part of the federation service 150. The assume role component 430 may, for example, use an account ID for the account and the IAM role from the map component 420 to make an assume roll call to the secure token service 280.

In response to the assume roll call, the secure token service 280 may return temporary credentials for the cloud computing service system 250, including an access key, secret key, and session token. A save component 440 of the federation service 150 may receive the temporary credentials and save them. The save component 440 may be implemented as, for example, any suitable software that may be part of the federation service 150. The save component 440 may save the temporary credentials, including the access key, secret key, and security token, to a datastore such as, for example, the storage 140, so that they may be used in the future by the emulation system computing device 100. The temporary credentials may then be returned to the virtual private cloud instance 200 that originally sent the federation service request. The temporary credentials may be used by the emulation system computing device 100 to access services provided by the cloud computing service system 250 on behalf of the user of the virtual private cloud instance 200. The federation service 150 may allow the emulation system computing device 100 to emulate access control methods and policies in target regions that are not available commercially. This may also allow the emulation system computing device 100 to test multiple methods of cloud computing service access control outside of roles and access key/secret keys.

Figure 5:
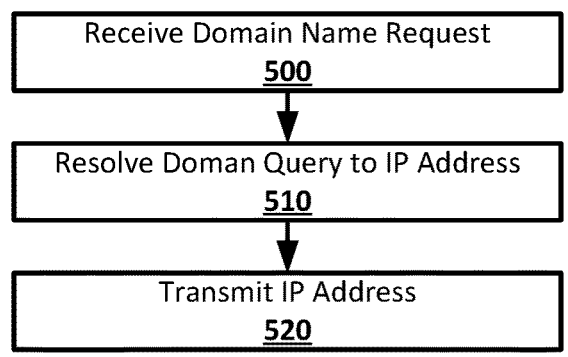
FIG. 5 shows an example procedure suitable for emulation of cloud computing service regions according to an implementation of the disclosed subject matter.

FIG. 5 shows an example arrangement suitable for emulation of cloud computing service regions according to an implementation of the disclosed subject matter. At 500, a domain name request may be received. For example, the DNS service 130 of the emulation system computing device 100 may receive a domain name request from a system or application running in the virtual private cloud instance 200. The DHCP settings of the virtual private cloud instance 200 may have been changed to use the DNS service 130 to resolve DNS queries. The domain name request, or DNS query, may include, for example, a name associated with an endpoint associated with a target region, such as a custom or air-gapped region that may not yet be setup or accessible in the cloud computing service system 250.

At 510, the domain name request may be resolved. For example, the DNS service 130 may resolve the domain name request to an IP address associated with emulation system computing device 100.

At 520, the IP address may be transmitted. For example, the DNS service 130 may transmit the IP address to the system or application in the virtual private cloud instance 200 that submitted the domain name request.

Figure 6:
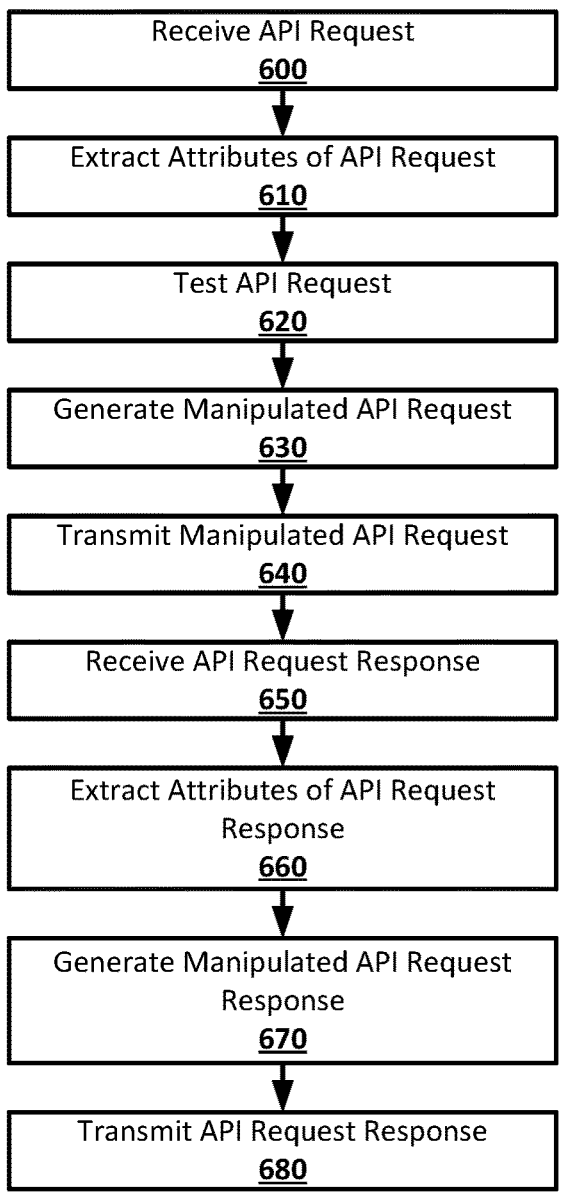
FIG. 6 shows an example procedure suitable for emulation of cloud computing service regions according to an implementation of the disclosed subject matter.

FIG. 6 shows an example arrangement suitable for emulation of cloud computing service regions according to an implementation of the disclosed subject matter. At 600, an API request may be received. For example, the emulation system computing device 100 may receive an API request from a system or application in the virtual private cloud instance 200. The API request include an indication of an endpoint associated with a target region, such as a custom or air-gapped region that may not yet be setup or accessible in the cloud computing service system 250. The API request may be routed to the emulation service 120 of the emulation system computing device 100.

At 610, attributes may be extracted from the API request. For example, the emulation service 120 may extract attributes such as from the API request payload including, for example, a host name, parameters, headers, the body, a path, a query string, a URI, a URL, a service name, and a subdomain.

At 620, the API request may be tested. For example, the emulation service 120 may run any suitable tests and checks on the various attributes of the API request to determine whether they are appropriate for use in a target region. The API request may be rejected if attributes of the API request fail any tests or checks performed by the test component 320, which may result, for example, in the emulation service 120 rejecting the API request and generating a 400 HTML, response which may include information as to what attribute of the API request failed, why it failed, and how the failure may be remediated. If the API request is not rejected, the attributes of the API request may be passed on to be used to generate a manipulated API request. Results of tests and checks performed by the test component 320 may be stored, along with the API request, in the storage 140 so that may be retrieved and displayed to a user at a later time.

At 630, a manipulated API request may be generated. For example, the emulation service 120 may manipulate and replace the various attributes extracted from the API request to generate a manipulated API request that may be valid in a standard region of the cloud computing service system 250, such as the cloud computing service region 270. For example, the attributes extracted from the API request may reference endpoints associated with the target region, such as a custom or air-gapped region that may not yet be setup or accessible. The emulation service 120 may replace those endpoint references with references to endpoints located in the cloud computing service region 270. The manipulated and replace attributes that were extracted from the API request may be compiled into a manipulated API request.

At 640, the manipulated API request may be transmitted. For example, the emulation service 120 may transmit the manipulated API request to the cloud computing service region 270, which may be standard region of the cloud computing service system 250. The manipulated API request may valid in the cloud computing service region 270, and may not be valid in the target region that the API request received by the emulation service 120 was valid in.

At 650, an API request response may be received. For example, the emulation system computing device 100 may receive an API request response from the cloud computing service region 270 in response to the manipulated API request transmitted by the emulation system computing device 100. The API request response may be the result of the processing of the manipulated API request by the cloud computing service region 270 using any suitable computational resources and accessing any suitable data sources.

At 660, attributes of the API response request may be extracted. For example, the emulation service 120 may example, extract attributes such as the headers and the body of the API request response.

At 670, a manipulated API request response may be generated. For example, the emulation service 120 may manipulate and replace the attributes extracted from the API request response so that values which are valid for the cloud computing service region 270 are converted into custom values that are valid for the target region that the API request was intended for. The manipulated and replaced attributes may be compiled to generate a manipulated API request response. The manipulated API request response may be an API request response that may appear to have been generated by the target for which the API request was intended instead of a standard region, such as, for example, the cloud computing service region 270.

At 680, the API request response may be transmitted. For example, the emulation service 120 may transmit the manipulated API request response to the virtual private cloud instance 200 as a valid API request response to the API request sent out by the virtual private cloud instance 200. The system or application on the virtual private cloud instance 200 that generated the API request for the target region may be unable to tell that the manipulated API request response was generated using an API request response that was not generated by that target region. In this way, the system or application on the virtual private cloud instance 200 may run as if it is using the target region, even when that that target region is a custom or air-gapped region that is not setup or accessible.

Figure 7:
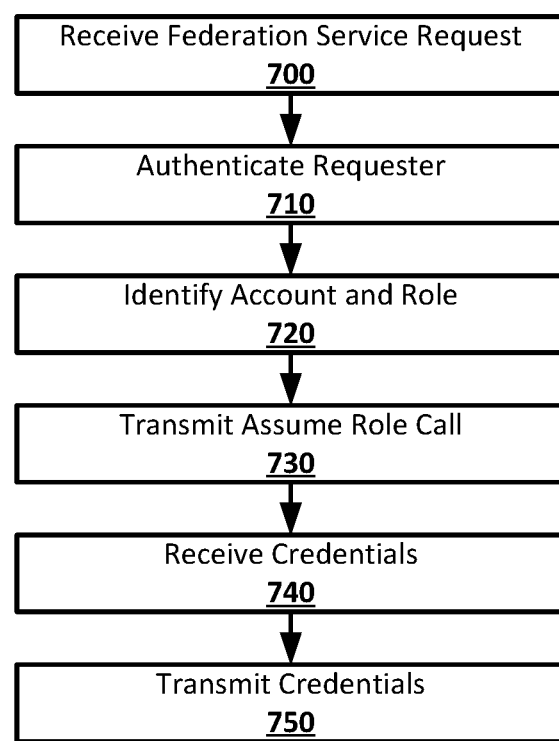
FIG. 7 shows an example procedure suitable for emulation of cloud computing service regions according to an implementation of the disclosed subject matter.

FIG. 7 shows an example arrangement suitable for emulation of cloud computing service regions according to an implementation of the disclosed subject matter. At 700, a federation service request may be received. For example, the emulation system computing device 100 may receive a federation service request from the virtual private cloud instance 200. The federation service request may include, for example, a PKI certificate and a query string indicating a cloud computing service account and a cloud computing service role.

At 710, the requester may be authenticated. For example, the federation service 150 of the emulation system computing device 100 may use the attributes of the PKI certificate in the request to verify or authenticate the requester that submitted the federation service request. The federation service 150 may, for example, use the CN and DN, to authenticate the requester. request.

At 720, an account and a role may be identified. For example, the federation service 150 may use query string parameters and the PKI certificate in the federation service request to identify the cloud computing service account and the cloud computing service role which the user is requesting to get credentials. The federation service 150 may map the parameters and their values from the federation service request to an account on the cloud computing service system 250 and an identity and access management (IAM) role that may have been pre-associated prior to the federation service request. The account and role may be stored in a federation datastore, for example, as part of the storage 140, that the federation service 150 may have has access to.

At 730, an assume role call may be transmitted. For example, the federation service 150 transmit an API call to the secure token service 280 to assume the identified role for the identified account. The assume role API call may include, for example, the PKI certificate and other parameters that were received as part of the federation service request.

At 740, credentials may be received. For example, the federation service 150 may receive temporary credentials from the secure token service 280. The temporary credentials may be for the account and role identified by the federation service 150 and may be in the form of an access key, secret key, and a session token. The federation service 150 may store the temporary credentials on the emulation system computing device 100, for example, in the storage 140. The emulation system computing device 100 may use the temporary credentials to access the identified account on cloud computing service system 250 in the identified role. This may allow, for example, the emulation service 120 to submit API requests to a region of the cloud computing service system 250 using the account of the user of the virtual private cloud instance 200. In some implementations, the temporary credentials may be for an account that belongs to the emulation system computing device 100.

At 750, the credentials may be transmitted. For example, the federation service 150 may transmit the credentials received from the secure token service 280, for example, temporary credentials including an access key, secret key, and session token, to the virtual private cloud instance 200 from which the federation service request was received.

Figure 8:
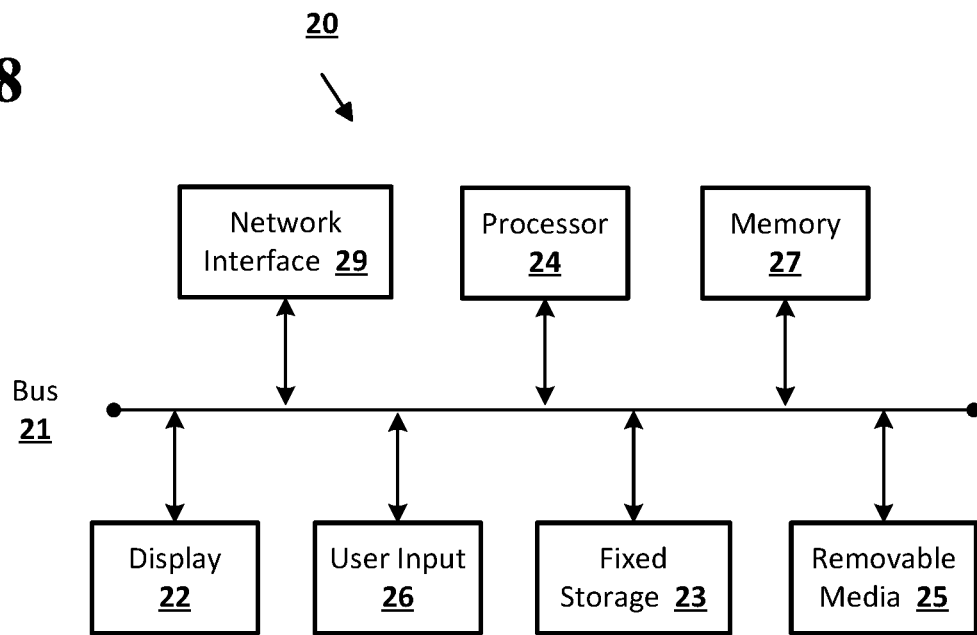
FIG. 8 shows a computer according to an embodiment of the disclosed subject matter.

Implementations of the presently disclosed subject matter may be implemented in and used with a variety of component and network architectures. FIG. 8 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection, or the like. For example, the network interface 29 may allow the computer to communicate with other computers via one or more local, wide-area, or other networks, as shown in FIG. 9.

Many other devices or components (not shown) may be connected in a similar manner (e.g., document scanners, digital cameras, and so on). Conversely, all of the components shown in FIG. 8 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, removable media 25, or on a remote storage location.

Figure 9:
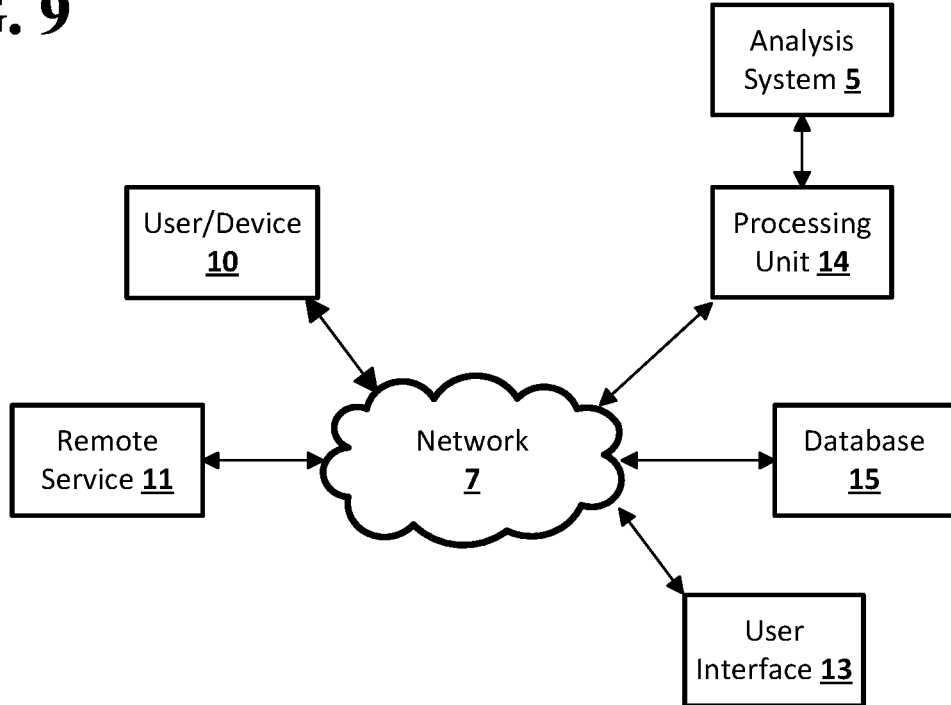
FIG. 9 shows a network configuration according to an embodiment of the disclosed subject matter.

FIG. 9 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. The disclosed subject matter also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

Implementations may use hardware that includes a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method performed by a data processing apparatus, the method comprising:
    receiving, at an emulation system from a system in a virtual private cloud, an Application Programming Interface (API) request comprising an indication of an endpoint associated with a target region of a cloud computing service, wherein the target region is a custom region or an air-gapped region of the cloud computing service;
    extracting one or more attributes from the API request;
    generating a manipulated API request from the extracted one or more attributes of the API request, wherein the manipulated API request comprises an indication of an endpoint located in a standard region of the cloud computing service, wherein the standard region is neither a custom region or an air-gapped region of the cloud computing service; and
    transmitting the manipulated API request to the endpoint located in the standard region of the cloud computing service.

2. The computer-implemented method of claim 1, wherein generating a manipulated API request from the extracted one or more attributes of the API request comprises replacing the indication of the endpoint associated with the target region of the API request with the indication of the endpoint located in the standard region of the cloud computing service.

3. The computer-implemented method of claim 1, further comprising:
    receiving, at the emulation system, an API request response comprising an indication of an endpoint located in the standard region of the cloud computing service;
    extracting one or more attributes from the API request response;
    generating a manipulated API request response from the extracted one or more attributes of the API request response, wherein the manipulated API request response comprises an indication of an endpoint located in the target region of a cloud computing service; and
    transmitting the manipulated API request response to the system in the virtual private cloud.

4. The computer-implemented method of claim 3, wherein generating a manipulated API request response from the extracted one or more attribute of the API request response comprises replacing the indication of the endpoint located in the standard region of the cloud computing service of the API request response with the indication of the endpoint associated with the target region.

5. The computer-implemented method of claim 1, further comprising:
    receiving, at the emulation system, from the system in the virtual private cloud, a Domain Name System (DNS) query comprising a name associated with an endpoint associated with the target region, wherein the system in the virtual private cloud is configured to send DNS queries to a DNS service of the emulation system;
    resolving the DNS query to an IP address of the emulation system; and
    transmitting the IP address to the system in the virtual private cloud.

6. The computer-implemented method of claim 1, further comprising:
    performing one or more tests on the API request received from the system in the virtual private cloud, wherein results of the tests are based on whether the API request is properly formed to be used with the target region of the cloud computing service; and
    storing the results of the one or more tests in a database.

7. The computer-implemented method of claim 1, further comprising:
    receiving, at the emulation system, a Public Key Infrastructure (PKI) certificate and a query string indicating a cloud computing service account and a cloud computing service role;
    authenticating, by federation service of the emulation system, a sender of the PKI certificate based on one or more attributes of the PKI certificate;
    requesting, by the federation service, temporary credentials for the cloud computing service using the PKI certificate, wherein the temporary credentials comprise credentials for access to the cloud computing service account with the cloud computing service role;

receiving, by the emulation system, the temporary credentials; and sending the temporary credentials to the sender of the PKI certificate.

8. The computer-implemented method of claim 1, further comprising testing one or more logs generated by a region of the cloud computing service.

9. A computer-implemented system comprising:

one or more storage devices;

one or more processors that receive from a system in a virtual private cloud, an Application Programming Interface (API) request comprising an indication of an endpoint associated with a target region of a cloud computing service, wherein the target region is a custom region or an air-gapped region of the cloud computing service, extract one or more attributes from the API request, store the API request in the one or more storage devices, generate a manipulated API request from the extracted one or more attributes of the API request, wherein the manipulated API request comprises an indication of an endpoint located in a standard region of the cloud computing service, wherein the standard region is neither a custom region or an air-gapped region of the cloud computing service, and transmit the manipulated API request to the endpoint located in the standard region of the cloud computing service.

10. The computer-implemented system of claim 9, wherein the one or more processors generate a manipulated API request from the extracted one or more attributes of the API request by replacing the indication of the endpoint associated with the target region of the API request with the indication of the endpoint located in the standard region of the cloud computing service.

11. The computer-implemented system of claim 9, wherein the one or more processors further receive an API request response comprising an indication of an endpoint located in the standard region of the cloud computing service, extract one or more attributes from the API request response, generate a manipulated API request response from the extracted one or more attributes of the API request response, wherein the manipulated API request response comprises an indication of an endpoint located in the target region of a cloud computing service, and transmit the manipulated API request response to the system in the virtual private cloud.

12. The computer-implemented system of claim 11, wherein the one or more processors generate a manipulated API request response from the extracted one or more attribute of the API request response by replacing the indication of the endpoint located in the standard region of the cloud computing service of the API request response with the indication of the endpoint associated with the target region.

13. The computer-implemented system of claim 9, wherein the one or more processors further receive, from the system in the virtual private cloud, a Domain Name System (DNS) query comprising a name associated with an endpoint associated with the target region, wherein the system in the virtual private cloud is configured to send DNS queries to a DNS service of the emulation system, resolve the DNS query to an IP address of an emulation system comprising the one or more processors, and transmit the IP address to the system in the virtual private cloud.

14. The computer-implemented system of claim 9, wherein the one or more processors further perform one or more tests on the API request received from the system in the virtual private cloud, wherein results of the tests are based on whether the API request is properly formed to be used with the target region of the cloud computing service and store the results of the one or more tests in a database in the one or more storage devices.

15. The computer-implemented system of claim 9, wherein the one or more processors further receive a Public Key Infrastructure (PKI) certificate and a query string indicating a cloud computing service account and a cloud computing service role, authenticate a sender of the PKI certificate based on one or more attributes of the PKI certificate, request temporary credentials for the cloud computing service using the PKI certificate, wherein the temporary credentials comprise credentials for access to the cloud computing service account with the cloud computing service role, receive the temporary credentials, and send the temporary credentials to the sender of the PKI certificate.

16. The computer-implemented system of claim 9, wherein the one or more processors further test one or more logs generated by a region of the cloud computing service.

17. A system comprising: one or more computers and one or more storage devices storing instructions which are operable, when executed by the one or more computers, to cause the one or more computers to perform operations comprising:

receiving, at an emulation system from a system in a virtual private cloud, an Application Programming Interface (API) request comprising an indication of an endpoint associated with a target region of a cloud computing service, wherein the target region is a custom region or an air-gapped region of the cloud computing service;

extracting one or more attributes from the API request;

generating a manipulated API request from the extracted one or more attributes of the API request, wherein the manipulated API request comprises an indication of an endpoint located in a standard region of the cloud computing service, wherein the standard region is neither a custom region or an air-gapped region of the cloud computing service; and transmitting the manipulated API request to the endpoint located in the standard region of the cloud computing service.

18. The system of claim 17, wherein the instructions which are operable, when executed by the one or more computers, to cause the one or more computers to perform operations comprising generating a manipulated API request from the extracted one or more attributes of the API request further cause the one or more computers to perform operations comprising replacing the indication of the endpoint associated with the target region of the API request with the indication of the endpoint located in the standard region of the cloud computing service.

19. The system of claim 17, wherein the instructions, which are operable, when executed by the one or more computers, further cause the one or more computers to perform operations comprising:

receiving, at the emulation system, an API request response comprising an indication of an endpoint located in the standard region of the cloud computing service;

extracting one or more attributes from the API request response;

generating a manipulated API request response from the extracted one or more attributes of the API request response, wherein the manipulated API request response comprises an indication of an endpoint located in the target region of a cloud computing service; and transmitting the manipulated API request response to the system in the virtual private cloud.

20. The system of claim 19, wherein the instructions which are operable, when executed by the one or more computers, to cause the one or more computers to perform operations comprising generating a manipulated API request response from the extracted one or more attribute of the API request response further cause the one or more computers to perform operations comprising replacing the indication of the endpoint located in the standard region of the cloud computing service of the API request response with the indication of the endpoint associated with the target region.

* * * * *